United States Patent
Aranha et al.

(10) Patent No.: US 11,558,202 B2
(45) Date of Patent: Jan. 17, 2023

(54) NETWORK DEVICE AUTHENTICATION

(71) Applicant: Cisco Technology, Inc., San Jose, CA (US)

(72) Inventors: Linus Ryan Aranha, Los Gatos, CA (US); Shreyas Udayashankar Heranjal, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 835 days.

(21) Appl. No.: 16/040,171

(22) Filed: Jul. 19, 2018

(65) Prior Publication Data

US 2019/0036709 A1 Jan. 31, 2019

Related U.S. Application Data

(60) Provisional application No. 62/539,435, filed on Jul. 31, 2017.

(51) Int. Cl.
*H04L 9/32* (2006.01)
*G06F 21/33* (2013.01)
*G06F 21/44* (2013.01)

(52) U.S. Cl.
CPC ........... *H04L 9/3265* (2013.01); *G06F 21/33* (2013.01); *G06F 21/44* (2013.01); *H04L 9/321* (2013.01)

(58) Field of Classification Search
CPC ....... H04L 9/3265; H04L 9/321; G06F 21/33; G06F 21/44
See application file for complete search history.

(56) References Cited

U.S. PATENT DOCUMENTS

| 7,805,623 B2* | 9/2010 | Jia ........................ G06F 1/3203 713/300 |
| 7,965,842 B2* | 6/2011 | Whelan ............... H04L 63/1408 380/247 |
| 8,209,415 B2* | 6/2012 | Wei ....................... H04L 47/781 709/224 |
| 8,438,618 B2* | 5/2013 | Eldar .................. H04L 41/0806 713/157 |
| 8,543,715 B1* | 9/2013 | Rabbat .................. G06F 16/951 709/229 |
| 8,924,714 B2* | 12/2014 | Hatlelid .............. H04L 63/0823 709/238 |
| 8,954,732 B1* | 2/2015 | Watsen ............... H04L 63/0823 713/157 |

(Continued)

FOREIGN PATENT DOCUMENTS

EP         1881665 A1 *  1/2008   ......... H04L 63/0823
WO    WO-2008127447 A2 * 10/2008   ........... H04L 63/166

*Primary Examiner* — Baotran N To
(74) *Attorney, Agent, or Firm* — Polsinelli (57) ABSTRACT

A method of authenticating a network device may include receiving an authentication message from a third party server, the authentication message identifying a network device. The method may also include receiving a zero touch provisioning request comprising a certificate from the network device. The method may additionally include, determining the network device is associated with a third party that manages the third party server based on the certificate. The method may include transmitting a redirect message comprising a root certificate chain indicating that the network device is to send the zero touch provisioning request to the third party server.

20 Claims, 4 Drawing Sheets

(56) References Cited

U.S. PATENT DOCUMENTS

| | | | | |
|---|---|---|---|---|
| 9,027,039 | B2* | 5/2015 | Michels | G06F 9/54 |
| | | | | 719/328 |
| 9,590,972 | B2* | 3/2017 | Venkatanaranappa | |
| | | | | H04L 63/0815 |
| 9,762,569 | B2* | 9/2017 | Schneider | H04L 9/3265 |
| 10,447,683 | B1* | 10/2019 | Loladia | H04W 12/63 |
| 2005/0080899 | A1* | 4/2005 | Vogel | H04L 9/3265 |
| | | | | 709/225 |
| 2007/0297396 | A1* | 12/2007 | Eldar | H04L 63/08 |
| | | | | 370/356 |
| 2009/0165099 | A1* | 6/2009 | Eldar | H04L 41/0869 |
| | | | | 726/5 |
| 2010/0251144 | A1* | 9/2010 | Shaty | G06F 21/64 |
| | | | | 715/760 |
| 2013/0019295 | A1* | 1/2013 | Park | G06F 21/33 |
| | | | | 726/7 |
| 2013/0086670 | A1* | 4/2013 | Vangpat | H04L 63/102 |
| | | | | 726/8 |
| 2014/0122674 | A1* | 5/2014 | Gray | H04L 67/10 |
| | | | | 709/222 |
| 2014/0189839 | A1* | 7/2014 | Jezek | H04L 63/0815 |
| | | | | 726/8 |
| 2015/0264040 | A1* | 9/2015 | Schneider | H04L 9/3265 |
| | | | | 726/10 |
| 2016/0012498 | A1* | 1/2016 | Prasad | G06Q 30/0185 |
| | | | | 705/26.1 |
| 2016/0099969 | A1* | 4/2016 | Angus | H04L 63/0823 |
| | | | | 713/158 |
| 2016/0366586 | A1* | 12/2016 | Gross | H04L 63/0876 |
| 2017/0257220 | A1* | 9/2017 | Guo | H04L 9/3263 |
| 2018/0316510 | A1* | 11/2018 | Rai | H04L 9/3268 |

\* cited by examiner

NETWORK DEVICE AUTHENTICATION

CROSS REFERENCE TO RELATED APPLICATIONS

This application claims priority to U.S. Patent App. No. 62/539,435, filed on Jul. 31, 2017, which is hereby incorporated by reference in its entirety.

FIELD

The embodiments discussed in the present disclosure are related to network device authentication.

BACKGROUND

The use of networks is a useful tool in allowing communication between distinct computing devices. Despite the proliferation of computers and networks over which computers communicate, there still remain various limitations to current network technologies.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method of authenticating a network device. The method may include receiving an authentication message from a third party server, the authentication message identifying a network device. The method may also include receiving a ZTP request including a certificate from the network device. The method may additionally include, determining the network device is associated with a third party that manages the third party server based on the certificate. The method may include transmitting a redirect message comprising a root certificate chain indicating that the network device is to transmit the ZTP request to the third party server.

One or more embodiments of the present disclosure may additionally include systems and/or non-transitory computer readable media for facilitating the performance of such methods.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments of the present disclosure relate to improvements to the operation of authenticating a network device. Such authentication may occur without a network administrator being present and may be performed by software and/or hardware routines based on the network device being connected to a network. Additionally, after authentication, the network device may be provisioned to be operational without further input from a network administrator. Such authentication and/or provisioning of the network device may be referred to as zero touch provisioning (ZTP). In some embodiments, the provisioning information may be received from a third party server, but an original equipment manufacturer (OEM) server may facilitate the authentication of the network device. For example, a third party server associated with an authorized seller may send an authentication message to an OEM server. The authorized seller may be an authorized retailer or a service provider that provides network devices manufactured by the OEM to end users. The authentication message may include a request for the OEM server to grant permission to the third party server to perform ZTP of associated network devices. Network devices may be configured to send a ZTP request (e.g., request an initial configuration) to the OEM server as part of a boot-up process. The OEM server may authenticate the network device as being associated with the OEM server based on the ZTP request, but managed by the authorized seller. In response to the ZTP request and authenticating the network device, the OEM server may transmit a redirect message to the network device such that the network device will contact a server of the authorized seller to receive provisioning information.

In this way, the OEM server need not manage records of which particular end user was provided a particular network device. Instead, the OEM server may manage records of which particular authorized seller was provided the particular network device and if there is an authorized third party server associated with the authorized seller. Because the OEM server redirects network devices to third party servers, the OEM server may provide initial service to a greater number of network devices than if the OEM server performed ZTP for each network device. Furthermore, the OEM server may still facilitate secure authentication of each network device such that stolen or hacked network devices may be required to authenticate with the OEM server.

Additionally, having the OEM server redirect network devices to third party servers may improve the overall performance of the associated network and network devices. For example, allowing third party servers to perform ZTP of network devices may decrease an amount of time used for provisioning each network device due to the network devices being provisioned by more than just OEM servers. As another example, by instructing the network devices to send ZTP requests to the third party servers, processing power of the OEM server available for other functions may increase and may reduce an amount time taken to perform the other functions. As an additional example, allowing the network devices to be provisioned by the third party servers may increase available communication bandwidth between the OEM server and other devices (such as the third party servers), which may increase a data rate transfer between the OEM server and the other devices.

Embodiments of the present disclosure are explained with reference to the accompanying drawings.

Figure 1:
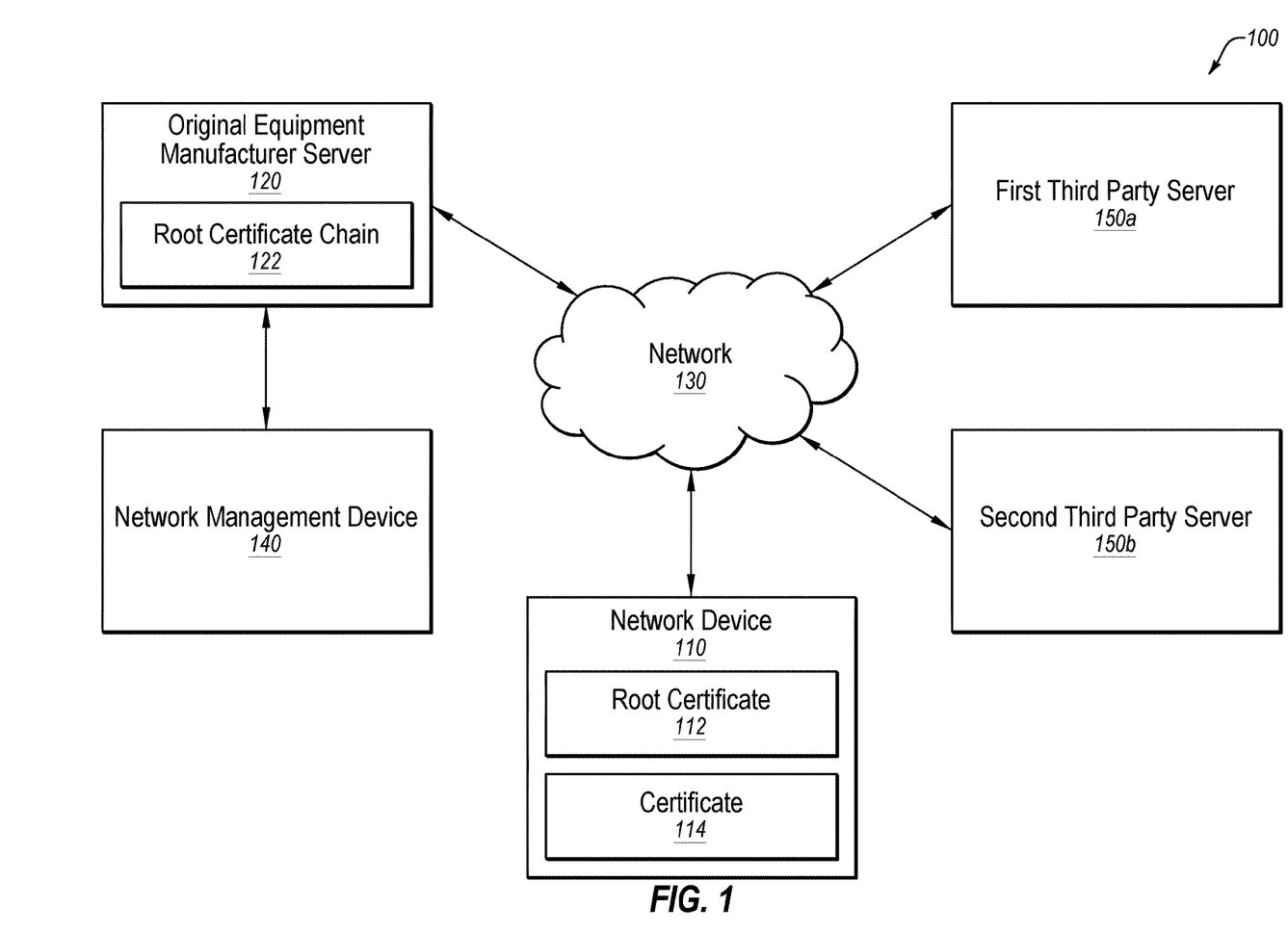
FIG. 1 illustrates an example system of network components implementing authentication of a network device.

FIG. 1 illustrates an example system 100 of network components implementing authentication of a network device 110, in accordance with one or more embodiments of the present disclosure. The system 100 may include the network device 110, an OEM server 120, a network management device 140, and third party servers 150 (such as a first third party server 150a and a second third party server 150b). The system 100 may also include a network 130 communicatively coupled to the OEM server 120, the network device 110, and the third party servers 150. In some embodiments, messages sent and/or received by the OEM server 120, the network device 110, and/or the third party servers 150 may be sent and/or received over the network 130.

In some embodiments, the OEM server 120 may be operated by an entity that manufactures (e.g., an OEM) or otherwise provides the network device 110 to a third party (e.g., an authorized seller, a reseller, a licensee, a sub-licensee, a partner, a service integrator, or any entity reselling and/or managing edge network devices.). In some embodiments, the third party may provide the network device 110 to an end user for use in a network associated with the end user. In these and other embodiments, the OEM server 120 may manage records of which third party was provided the network device 110. Additionally or alternatively, records of which particular network the network device 110 is being implemented in may be managed by the authorized seller.

In some embodiments, the third party may manage the network device 110 through one or more of the third party servers 150. In these and other embodiments, the OEM server 120 may be configured to map the network device 110 to a particular third party server 150 in response to authentication of a third party server 150. Additionally or alternatively, the third party servers 150 may be configured to map the network device 110 to a particular network.

In some embodiments, the OEM server 120 may receive an authentication message from one or more of the third party servers 150. In these and other embodiments, the authentication message may identify the particular third party associated with the one or more third party servers 150 and may identify the network device 110 as being managed by the third party and that the network device 110 is to be authenticated and provisioned. In some embodiments, the third party servers 150 may request permission to perform ZTP of the network device 110. In these and other embodiments, the OEM server 120 may determine that the third party identified in the authentication message is the same or similar to the third party indicated in the records managed by the OEM server 120 and may grant permission to the third party servers 150 to perform ZTP of the network device 110. For example, the OEM server 120 may receive an authentication message from the first third party server 150a identifying the network device 110 and requesting permission to perform ZTP of the network device 110. The OEM server 120 may determine that the entity identified in the authentication message from the first third party server 150a is the same or similar to the third party indicated in the records managed by the OEM server 120. Additionally or alternatively, the OEM server 120 may determine whether any identifying feature (such as a number associated with the organization name, a device identification, chassis number, and/or MAC address) identified in the authentication message is the same or similar to identifying features included in the records of the OEM server 120.

In some embodiments, the authentication message received by the OEM server 120 may request permission for the third party server 150 that sent the authentication message to perform ZTP of the network device 110. For example, the OEM server 120 may receive an authentication message from the first third party server 150a requesting permission for the first third party sever 150a to perform ZTP of the network device 110. In these and other embodiments, the authentication message received by the OEM server 120 may request permission for a different third party server 150 to perform ZTP of the network device 110. For example, the OEM server 120 may receive an authentication message from the first third party server 150a requesting permission for the second third party server 150b to perform ZTP of the network device 110. Additionally or alternatively, the authentication message received by the OEM server 120 may request permission for multiple third party servers 150 to perform ZTP of the network device 110. For example, the OEM server 120 may receive an authentication message from the first third party server 150a requesting permission for either or both the first third party server 150a and the second third party server 150b to perform ZTP of the network device 110. In some embodiments, the authentication message received by the OEM server 120 may request permission for a third party server not communicatively coupled to the network 130 (not illustrated in FIG. 1) to perform ZTP of the network device 110.

In some embodiments, in response to granting permission to the third party servers 150, the OEM server 120 may transmit a permission message to the third party servers 150. In these and other embodiments, the permission message may include security protocols for performing ZTP of the network device 110. For example, the security protocols may instruct the third party servers 150 to encrypt any communication between the network device 110 and the third party servers 150. For example, the permission message may indicate that communication between the network device 110 and the third party servers 150 is to be encrypted using public key interceptor (PKI), since PKI is performed using certificates. Additionally or alternatively, the security protocols may instruct the third party servers 150 to authenticate the network device 110 prior to performing ZTP of the network device 110.

In some embodiments, the OEM server 120 may create a root certificate chain 122 based on authentication messages received from the third party servers 150. In these and other embodiments, the root certificate chain 122 may include a list of the third party servers 150 that are third party servers with permission to perform ZTP of the network device 110. For example, the list included in the root certificate chain 122 may include the first third party server 150a as a third party server with permission to perform ZTP of the network device 110. In another example, the list included in the root certificate chain 122 may include the first third party server 150a and the second third party server 150b as third party servers with permission to perform ZTP of the network device 110.

In some embodiments, the network device 110 may include a certificate 114 identifying the network device 110 and including an organization name of the OEM associated with the network device 110. In these and other embodiments, the certificate 114 may be programmed on the network device 110 by the OEM during manufacture. In some embodiments, the network device 110 may send a ZTP request to the OEM server 120 that includes the certificate 114.

In some embodiments, the OEM server 120 may authenticate the network device 110 based on the certificate 114. In these and other embodiments, the OEM server 120 may authenticate the network device 110 by determining whether the organization name included the certificate 114 is the same or similar to the organization name of the OEM server 120, or whether a numerical value matches a stored numerical value, or any other authentication technique. Additionally or alternatively, the OEM server 120 may determine whether any identifying feature (such as a number associated with the organization name, a device identification, a chassis number, and/or MAC address) included in the certificate 114 is the same or similar to identifying features included in the records of the OEM server 120. In some embodiments, the OEM server 120 may authenticate the network device based on the certificate 114 and the authentication message received from the third party servers 150. In these and other embodiments, the OEM server 120 may authenticate the network device 110 by determining whether the organization name included in the certificate 114 is the same or similar to the organization name of the OEM server 120 and by determining that the network device 110 identified in the authentication message is the same or similar to the network device 110 identified in the certificate 114.

In some embodiments, the OEM server 120 may determine that the network device 110 is associated with the third party that manages one or more of the third party servers 150 based on the certificate 114 and/or the authentication message. In these and other embodiments, the OEM server 120 may send an organization status request to the network management device 140 requesting the network management device 140 to determine whether the network device 110 is associated with the third party and if so, which of the third party servers 150 are managed by the third party. In some embodiments, the network management device 140 may include a list of network devices that are associated with the third party and which of the third party servers 150 are managed by the third party. In these and other embodiments, the network management device 140 may determine whether the network device 110 is included in the list of network devices that are associated with the third party and may send an organization status to the OEM server 120 indicating whether or not the network device 110 is associated with the third party.

In some embodiments, in response to authenticating the network device 110 and determining that the network device 110 is associated with the third party, the OEM server 120 may send a redirect message to the network device 110. In these and other embodiments, the redirect message may include the root certificate chain 122 indicating which third party servers 150 are third party servers with permission to perform ZTP of the network device 110. Additionally or alternatively, the redirect message may instruct the network device 110 to send ZTP requests to the third party servers 150. For example, the OEM server 120 may send a redirect message to the network device 110 including the root certificate chain 122 indicating that the second third party server 150*b* is a third party server with permission to perform ZTP of the network device 110 and that the network device 110 is to send ZTP requests to the second third party server 150*b*.

In some embodiments, the redirect message may include security protocols for the network device 110 to communicate with the third party servers 150. In these and other embodiments, the security protocols may ensure the network device 110 is not redirected to a third party server 150 that does not have permission to perform ZTP of the network device 110 or otherwise becomes compromised. For example, the security protocols may indicate a maximum number of third party servers 150 to which the network device 110 may be redirected. In another example, the security protocols may indicate that communication between the network device 110 and the third party servers 150 is to be encrypted. Additionally or alternatively, the security protocols may instruct the network device 110 to perform certain functions in response to one or more security protocols not being followed. For example, if the network device 110 is directed to more third party servers 150 than the security protocols allow, the network device 110 may automatically shut down. Additionally or alternatively, if one or more of the security protocols are not being followed, the network device 110 may send a follow up message to the OEM server 120 asking for further instructions.

In some embodiments, the network device 110 may include a root certificate 112 identifying the OEM server 120 and including the organization name of the OEM associated with the OEM server 120. In these and other embodiments, the root certificate 112 may be programmed on the network device 110 by the OEM during manufacture.

In some embodiments, the network device 110 may verify that the network device 110 is communicating with the OEM server 120. For example, the network device 110 may confirm the identity of the OEM server 120 based on the root certificate 112 and/or the redirect message received from the OEM server 120. In these and other embodiments, the network device 110 may verify the identity of the OEM server 120 to ensure the network device 110 is not being redirected to a third party server 150 that does not have permission to perform ZTP of the network device 110. For example, the network device 110 may determine that the organization name of the OEM server 120 identified in the redirect message is the same or similar to the organization name included in the root certificate 112. Additionally or alternatively, the network device 110 may determine whether any identifying feature (such as a number associated with the organization name, a device identification, a chassis number, and/or MAC address) included in the redirect message is the same or similar to identifying features included in the root certificate 112. Such identity verification may prevent a hacked or pirated server from attempting to appear as the OEM server 120 to the network device 110.

In some embodiments, in response to receiving the redirect message, the network device 110 may update the root certificate 112 based on the root certificate chain 122. In these and other embodiments, the network device 110 may update the root certificate 112 to include third party servers with permission to perform ZTP of the network device 110 listed in the root certificate chain 122. In some embodiments, the root certificate 112 may be updated to include the organization name of the third party that manages the third party servers 150.

In some embodiments, in response to receiving the redirect message, the network device 110 may send ZTP requests to the third party servers 150. In these and other embodiments, the network device 110 may verify the identity of the third party servers 150 based on the root certificate 112. In some embodiments, the network device 110 may determine that the organization name in the root certificate 112 is the same or similar to the organization name of the third party that manages the third party servers 150. Additionally or alternatively, the network device 110 may verify whether any identifying feature (such as a number associated with the organization name, a device identification, a chassis number, and/or MAC address) of the third party servers 150 included in the root certificate 112 is the same or similar to identifying features of the third party that manages the third party servers 150.

In some embodiments, the third party servers 150 may authenticate the network device 110 based on the ZTP request. In these and other embodiments, the ZTP request sent to the third party servers 150 may include the certificate 114. In some embodiments, the third party servers 150 may compare the network device identified in the certificate 114 to the network devices included in the records managed by the third party servers 150. In these and other embodiments, the third party servers 150 may authenticate the network device 110 by determining that the network device identified in the certificate 114 is the same or similar to a network device included in the records managed by the third party servers 150. Additionally or alternatively, the third party server 150 may determine whether any identifying feature (such as a number associated with the organization name, a device identification, chassis number, and/or MAC address) identified in the certificate 114 is the same or similar to identifying features of the network device included in the records managed by the third party servers 150.

In some embodiments, the OEM server 120 may receive a reauthentication message from the third party servers 150. In some embodiments, the reauthentication message may indicate that the network device 110 is being assigned to a different third party server 150. For example, the OEM server 120 may receive a reauthentication message from the first third party server 150a indicating that the network device 110 is being assigned to the second third party server 150b. In these and other embodiments, the OEM server 120 may update the root certificate chain 122 to include the different third party server 150 as a third party server with permission to perform ZTP of the network device 110. In some embodiments, the OEM server 120 may send the redirect message including the updated root certificate chain 122 to the network device 110, instructing the network device 110 to send ZTP requests to the second third party server 150b. In these and other embodiments, the third party may manage an inventory of network devices 110 such that if one end user returns or is otherwise finished with a network device 110, the network device 110 may be assigned to a new end user and may be reprovisioned for that new end user while still being reauthenticated by the OEM server 120.

In some embodiments, the reauthentication message may indicate that the network device 110 is ready to be reauthenticated by the OEM server 120. In these and other embodiments, the reauthentication message may be sent in response to the network device 110 being used in a different end user network. For example, the reauthentication message may indicate that the network device 110 is being used by a different third party associated with a different third party server 150. In these and other embodiments, the OEM server 120 may update the root certificate chain 122 to redirect the network device 110 to send ZTP requests to the different third party server 150.

In some embodiments, the reauthentication message may be sent in response to the configuration of the network device 110 returning to default settings. In these and other embodiments, during the boot-up process, the network device 110 may send another ZTP request to the OEM server 120. For example, the first third party server 150a may send the reauthentication message to the OEM server 120 indicating that the network device 110 has returned to default settings and that the network device 110 may send another ZTP request to the OEM server 120.

In some embodiments, the OEM server 120 redirecting the network device 110 to the third party servers 150 may allow the third party that manages the third party servers 150 to have more flexibility for implementing the network device 110 in different networks. For example, the third party may more easily manage records of where (e.g., which specific network) the network device 110 is currently located. In another example, the third party may more easily transfer the network device 110 from one network to a different network. In another example, the third party may more quickly supply a replacement network device 110 to an end user for use in a network since the records managed by the third party are the only records to be updated to perform ZTP of the replacement network device 110 rather than updating the records managed by the third party and the OEM server 120.

Modifications, additions, or omissions may be made to FIG. 1 without departing from the scope of the present disclosure. For example, while illustrated as including a single network device 110, the system 100 may include any number of network devices 110. As another example, while illustrated as including a single OEM server 120, the system 100 may include any number of OEM servers 120. As another example, while illustrating a certain number of third party servers 150, the system 100 may include any number of third party servers 150. As another example, while illustrated as including a single network management device 140, the system 100 may include any number of network management devices 140.

Figure 2:
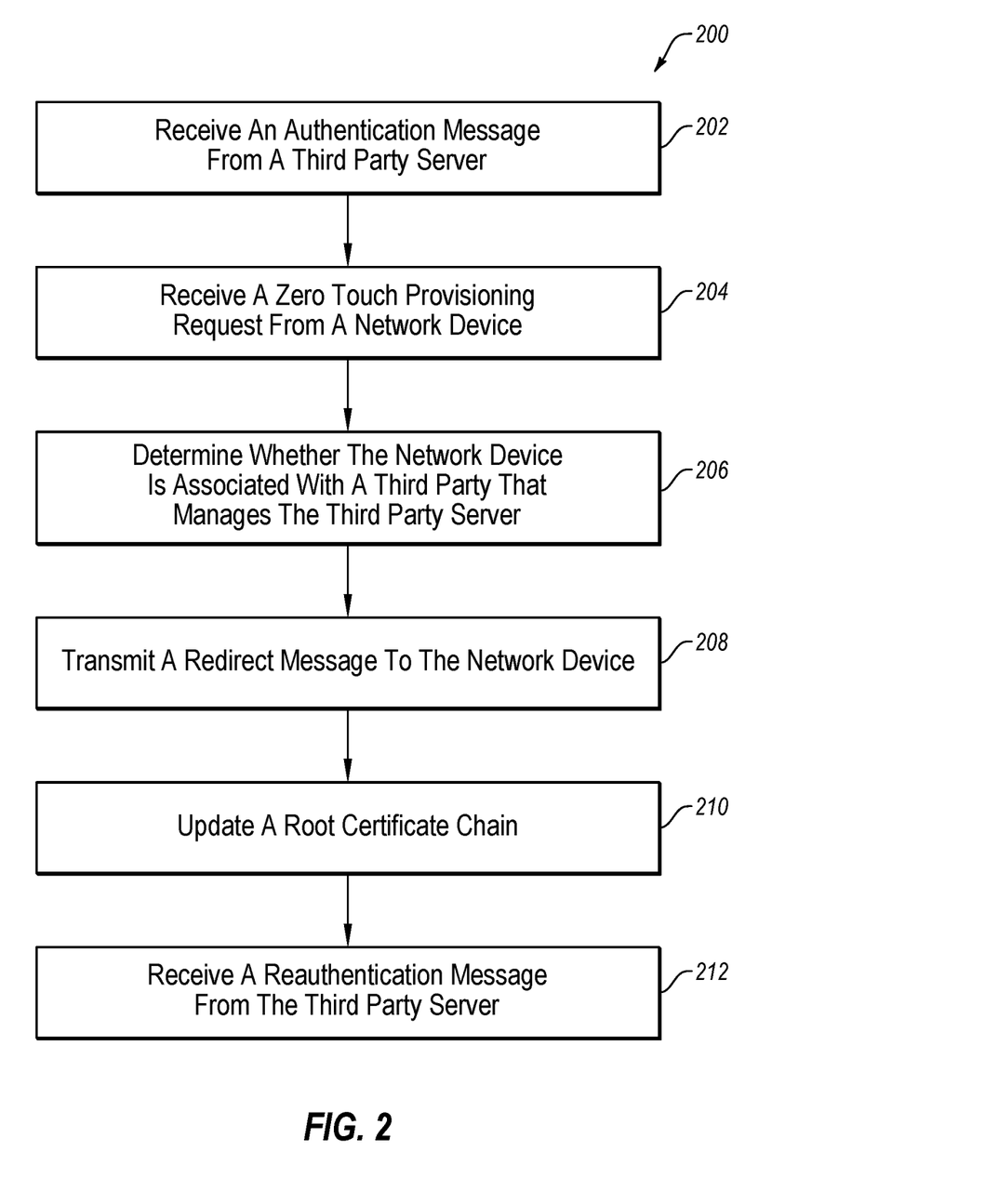
FIG. 2 illustrates a flowchart of an example method of authenticating a network device.

FIG. 2 illustrates a flowchart of an example method of authenticating a network device, in accordance with one or more embodiments of the present disclosure. Although illustrated as discrete blocks, various blocks may be divided into additional blocks, combined into fewer blocks, or eliminated, depending on the particular implementation.

At block 202, an authentication message may be received from a third party server that identifies a particular network device. For example, an OEM server (such as the OEM server 120 of FIG. 1) may receive the authentication message from the third party server (such as the third party servers 150 of FIG. 1) identifying a particular network device (such as the network device 110 of FIG. 1). In some embodiments, the third party server may be managed by a third party as discussed above in conjunction with FIG. 1. In these and other embodiments, the authentication message may request permission for the third party server to perform ZTP of the network device. For example, with reference to FIG. 1, the OEM server 120 may receive an authentication message from the first third party server 150a identifying the network device 110 and requesting permission for the first third party server 150a to perform ZTP of the network device 110. In some embodiments, the OEM server may grant permission to the third party server to perform ZTP of the network device. In these and other embodiments, the OEM server may create a root certificate chain that may include a list of third party servers with permission to perform ZTP of the network device. For example, with reference to FIG. 1, in response to granting permission to the first third party server 150a, the OEM server 120 may add the first third party server 150a to the root certificate chain 122.

At block 204, a ZTP request may be received from the network device. For example, the OEM server may receive a ZTP request from the network device. For example, with reference to FIG. 1, the OEM server 120 may receive a ZTP request from the network device 110. In some embodiments, the ZTP request may include a certificate that includes an organization name and identifies the network device, or some other identifying feature or information. In these and other embodiments, the organization name included in the certificate may match a name of the organization that manufactured the network device. Additionally or alternatively, the OEM server may authenticate the network device based on the certificate and the authentication message received from the third party server.

At block 206, a determination may be made as to whether the network device is associated with the third party that manages the third party server based on the certificate and/or the root certificate chain. For example, the OEM server may compare the network device identified in the certificate to a list of network devices identified in the root certificate chain as being associated with the third party that manages the third party server. For example, with reference to FIG. 1, the OEM server 120 may determine that the network device 110 is associated with the third party that manages the third party servers 150 by comparing the network device 110 identified in the certificate 114 to network devices listed in the root certificate chain 122 as being associated with the third party.

At block 208, a redirect message may be transmitted to the network device indicating that the network device is to send ZTP requests to the third party server. For example, the OEM server may transmit the redirect message to the network device indicating that the network device is to send ZTP requests to the third party server. For example, with reference to FIG. 1, the OEM server 120 may transmit a redirect message to the network device 110 indicating that the network device 110 is to send ZTP requests to the first third party server 150*a*.

At block 210, the root certificate chain may be updated. For example, the OEM server may update the root certificate chain to include a different third party server as a third party server with permission to perform ZTP of the network device. For example, with reference to FIG. 1, the OEM server 120 may update the root certificate chain 122 to include the second third party server 150*b* as a third party server with permission to perform ZTP of the network device 110. As another example, the root certificate chain may be updated such that the particular network device may be authenticated a second time and redirected back to the same third party server that provisioned the network device in the first instance.

At block 212, a reauthentication message may be received from the third party server. For example, the OEM server may receive the reauthentication message from the third party server indicating that the network device is being assigned to the different third party server and/or a different end user of the third party. For example, with reference to FIG. 1, the OEM server 120 may receive a reauthentication message from the first third party server 150*a* indicating that the network device 110 is being assigned to the second third party server 150*b*. In some embodiments, the reauthentication message may indicate that the particular network device will be provided to a new end user and is to be reprovisioned for that end user by the initial third party server (e.g., the first third party server 150*a* of FIG. 1).

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. For example, any identifying feature or information included in the certificate may match any identifying feature or information of the organization that manufactured the network device instead of determining whether the organization name included in the certificate matches the name of the organization that manufactured the network device.

Figure 3:
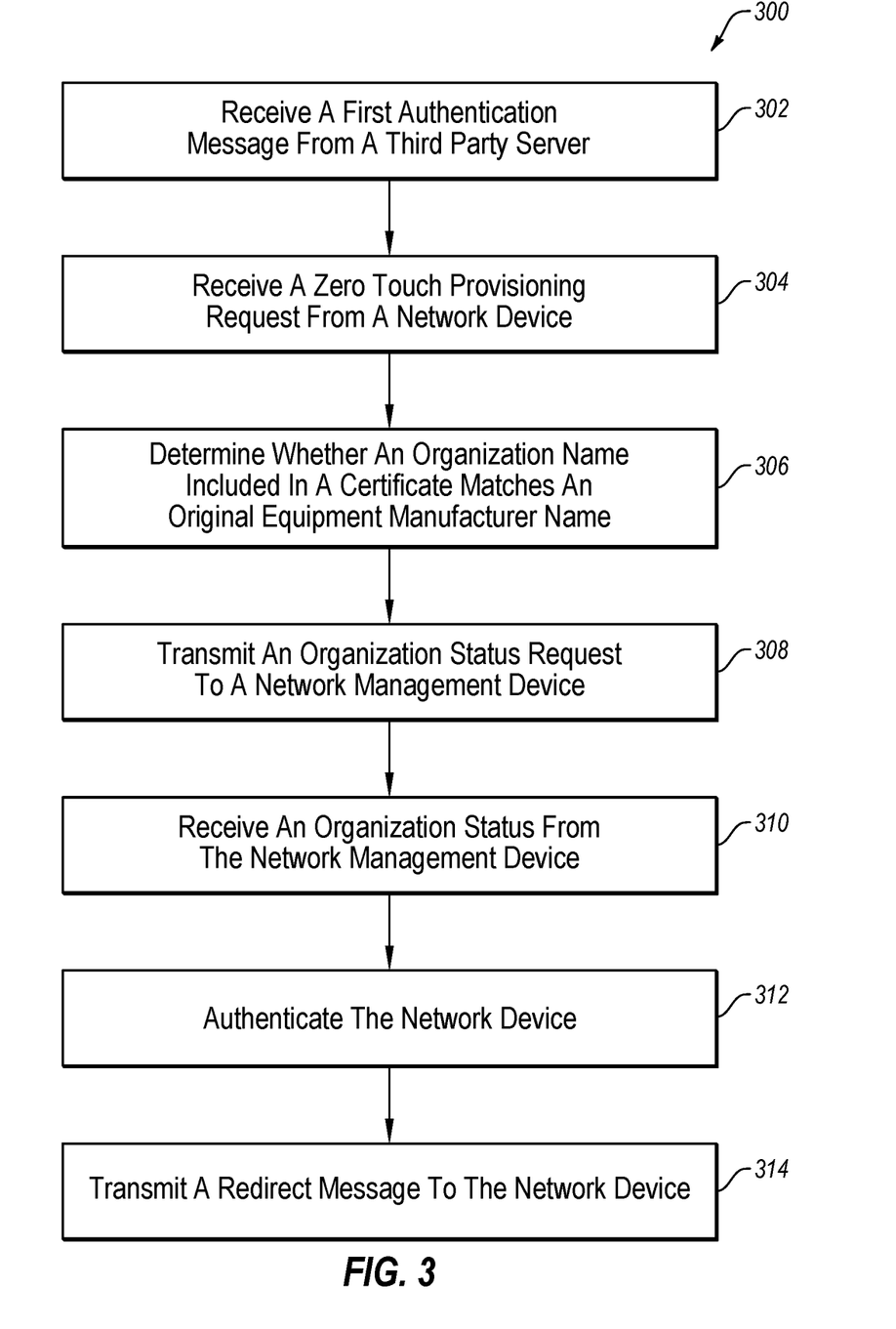
FIG. 3 illustrates a flowchart of another example method of authenticating a network device.

FIG. 3 illustrates a flowchart of another example method of authenticating a network device, in accordance with one or more embodiments of the present disclosure. Although illustrated as discrete blocks, various blocks may be divided into additional blocks, combined into fewer blocks, or eliminated, depending on the particular implementation.

At block 302, an authentication message may be received from a third party server. The block 302 of FIG. 3 may be similar or comparable to the block 202 of FIG. 2.

At block 304, a ZTP request may be received from the network device. The block 304 of FIG. 3 may be similar or comparable to the block 204 of FIG. 2.

At block 306, a determination may be made as to whether the organization name included in the certificate matches an organization name of the OEM server. For example, the certificate received from the network device may include the organization name associated with the network device. In some embodiments, the OEM server may compare the organization name included in the certificate to the organization name of the OEM server. In these and other embodiments, the OEM server may determine that the organization name included in the certificate is the same or similar to the organization name of the OEM server.

At block 308, an organization status request may be transmitted to a network management device. For example, the OEM server may transmit an organization status request to a network management device (such as the network management device 140 of FIG. 1) requesting the network management device to determine an organization status of the network device. In some embodiments, the organization status of the network device may indicate whether the network device is associated with the third party that manages the third party server. For example, with reference to FIG. 1, the OEM server 120 may transmit an organization status request to the network management device 140 requesting the network management device 140 to determine the organization status of the network device 110.

At block 310, the organization status may be received from the network management device. For example, the OEM server may receive the organization status from the network management device. In some embodiments, the organization status may indicate whether or not the network device is associated with the third party that manages the third party server. For example, with reference to FIG. 1, the OEM server 120 may receive an organization status from the network management device 140 indicating that the network device 110 is associated with the third party that manages the first third party server 150*a*.

At block 312, the network device may be authenticated by the OEM server. In some embodiments, the OEM server may authenticate the network device based on the authentication message received from the third party server and/or the ZTP request received from the network device. In these and other embodiments, the OEM server may compare the organization name included in the certificate to the organization name of the OEM server and the OEM server may compare the network device identified in the authentication message to the network device identified in the ZTP request. In these and other embodiments, the OEM server may authenticate the network device by determining that the organization name included in the certificate is the same or similar to the organization name of the OEM server. For example, with reference to FIG. 1, the OEM server 120 may authenticate the network device 110 based on an authentication message received from the first third party server 150a and/or the certificate 114 included in the ZTP request received from the network device 110.

At block 314, a redirect message may be transmitted to the network device. The block 314 of FIG. 3 may be similar or comparable to the block 208 of FIG. 2.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. For example, the OEM server may compare any identifying feature (such as a number associated with the organization name, a device identification, a chassis number, and/or MAC address) included in the certificate to any identifying feature of the OEM server instead of determining whether the organization name included in the certificate matches an organization name of the OEM server.

Figure 4:
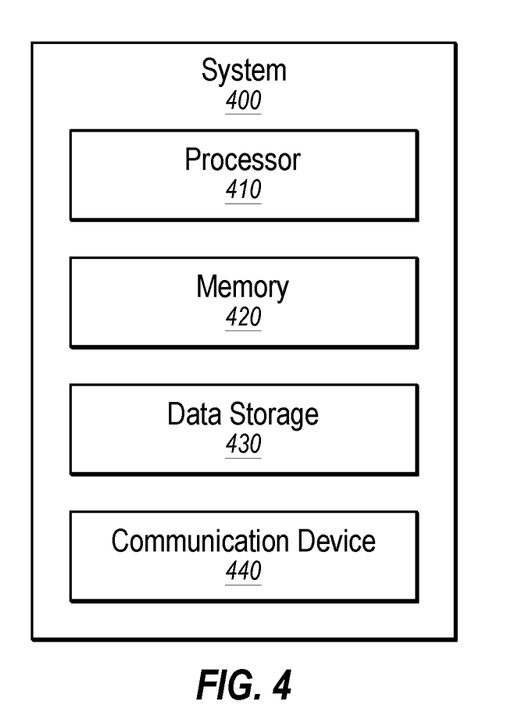
FIG. 4 illustrates an example computing system.

FIG. 4 illustrates an example computing system 400, according to at least one embodiment described in the present disclosure. The computing system 400 may include any suitable system, apparatus, or device configured to test software. The computing system 400 may include a processor 410, a memory 420, a data storage 430, and a communication device 440, which all may be communicatively coupled. In some embodiments, any of the network device (e.g., the network device 110 of FIG. 1), OEM server (e.g., the OEM server 120 of FIG. 1), network management device (e.g., the network management device 140 of FIG. 1), third party server (e.g., the third party servers 150 of FIG. 1) or other computing devices of the present disclosure may be implemented as the computing system 400. Additionally or alternatively, one or more of the network devices, control devices, local computing devices or other computing devices may be implemented as virtualized machines operating on a physical computing system such as the computing system 400.

Generally, the processor 410 may include any suitable special-purpose or general-purpose computer, computing entity, or processing device including various computer hardware or software modules and may be configured to execute instructions stored on any applicable computer-readable storage media. For example, the processor 410 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 4, it is understood that the processor 410 may include any number of processors distributed across any number of network or physical locations that are configured to perform individually or collectively any number of operations described in the present disclosure. In some embodiments, the processor 410 may interpret and/or execute program instructions and/or process data stored in the memory 420, the data storage 430, or the memory 420 and the data storage 430. In some embodiments, the processor 410 may fetch program instructions from the data storage 430 and load the program instructions into the memory 420.

After the program instructions are loaded into the memory 420, the processor 410 may execute the program instructions, such as instructions to perform one or more operations of the methods 200 and 300 of FIGS. 2 and 3, respectively. For example, the processor 410 may be configured to receive an authentication message from a third party server and may grant permission to the third party server to perform ZTP of a network device. As another example, the processor 410 may be configured to send a redirect message to the network device indicating that the network device is to send ZTP requests to the third party server. As an additional example, the processor 410 may be configured to create a root certificate chain that includes a list of third party servers that are a third party server with permission to perform ZTP of the network device.

The memory 420 and the data storage 430 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 410. In some embodiments, the computing system 400 may or may not include either of the memory 420 and the data storage 430.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 410 to perform a certain operation or group of operations.

The communication device 440 may include any component, device, system, or combination thereof that is configured to transmit or receive information over a network, such as an MPLS connection, the Internet, a cellular network (e.g., an LTE network), etc. In some embodiments, the communication device 440 may communicate with other devices at other locations, the same location, or even other components within the same system. For example, the communication device 440 may include a modem, a network card (wireless or wired), an optical communication device, an infrared communication device, a wireless communication device (such as an antenna), a chipset (such as a Bluetooth device, an 802.6 device (e.g., Metropolitan Area Network (MAN)), a WiFi device, a WiMax device, cellular communication facilities, or others), and/or the like, or any combinations thereof. The communication device 440 may permit data to be exchanged with a network and/or any other devices or systems described in the present disclosure. For example, the communication device 440 may allow the computing system 400 to communicate with other systems, such as network devices, control devices, and/or other networks.

Modifications, additions, or omissions may be made to the computing system 400 without departing from the scope of the present disclosure. For example, the data storage 430 may be multiple different storage mediums located in multiple locations and accessed by the processor 410 through a network.

As indicated above, the embodiments described in the present disclosure may include the use of a special purpose or general purpose computer (e.g., the processor 410 of FIG. 4) including various computer hardware or software modules, as discussed in greater detail below. Further, as indicated above, embodiments described in the present disclosure may be implemented using computer-readable media (e.g., the memory 420 or data storage 430 of FIG. 4) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method to authenticate a network device, the method comprising:

receiving an authentication message from a third party server, the authentication message identifying a network device;

receiving a zero touch provisioning (ZTP) request comprising a certificate from the network device;

determining the network device is associated with a third party that manages the third party server based on the certificate; and transmitting a redirect message comprising a root certificate chain indicating that the network device is to send the ZTP request to the third party server.

2. The method of claim 1, wherein the third party server is a first third party server, further comprising:

receiving a reauthentication message from the first third party server indicating that a second third party server associated with the first third party server is a third party server with permission to perform ZTP of the network device.

3. The method of claim 1, wherein the third party server is a first third party server, the method further comprising:
receiving a reauthentication message from the first third party server indicating that the network device is being assigned to a second third party server; and
updating the root certificate chain to indicate that, after being authenticated by the first third party server, the network device is to send ZTP requests to the second third party server.

4. The method of claim 1, further comprising after transmitting the redirect message, receiving a reauthentication message from the third party server identifying that the network device is ready to be reauthenticated.

5. The method of claim 1, wherein the redirect message includes a maximum number of third party servers the network device can be redirected to before performing a security check.

6. The method claim 5, wherein the security check comprises automatically shutting down after being redirected to more third party servers than the maximum number of third party servers.

7. The method of claim 1, wherein the certificate comprises an organization name, and wherein determining the network device is associated with the third party that manages the third party server based on the certificate comprises:
determining the organization name included in the certificate matches an original equipment manufacturer (OEM) name;
transmitting an organization status request to a network management device; and
receiving an organization status indicating that the network device is associated with the third party that manages the third party server.

8. The method of claim 1, further comprising:
authenticating the network device based on the authentication message and the ZTP request,
wherein the redirect message is sent in response to authenticating the network device.

9. A non-transitory computer-readable medium that includes computer-readable instructions stored thereon that are executable by a processor to perform or control performance of operations comprising:
receive an authentication message from a third party server, the authentication message identifying a network device;
receive a zero touch provisioning (ZTP) request comprising a certificate from the network device;
determine the network device is associated with a third party that manages the third party server based on the certificate; and
transmit a redirect message comprising a root certificate chain indicating that the network device is to send the ZTP request to the third party server.

10. The non-transitory computer-readable medium of claim 9, wherein the third party server is a first third party server, the operations further comprising:
receive a reauthentication message from the first third party server indicating that a second third party server associated with the first third party server is a third party server with permission to perform ZTP of the network device.

11. The non-transitory computer-readable medium of claim 9, wherein the third party server is a first third party server, the operations further comprising:
receive a reauthentication message from the first third party server indicating that the network device is being assigned to a second third party server; and
update the root certificate chain to indicate that, after being authenticated by the first third party server, the network device is to send ZTP requests to the second third party server.

12. The non-transitory computer-readable medium of claim 9, the operations further comprising after the operation of transmit the redirect message, receive a reauthentication message from the third party server identifying that the network device is ready to be reauthenticated.

13. The non-transitory computer-readable medium of claim 9, wherein the certificate comprises an organization name, and wherein the operation determine the network device is associated with the third party that manages the third party server based on the certificate further comprises:
determine the organization name included in the certificate matches an original equipment manufacturer (OEM) name;
transmit an organization status request to a network management device; and
receive an organization status indicating that the network device is associated with the third party that manages the third party server.

14. The non-transitory computer-readable medium of claim 9, the operations further comprising:
authenticate the network device based on the authentication message and the ZTP request,
wherein the redirect message is sent in response to authenticating the network device.

15. A system, comprising:
a network device; and
an original equipment manufacturer (OEM) server, the OEM server configured to perform operations, the operations comprising:
receive an authentication message from a third party server, the authentication message identifying the network device;
receive a zero touch provisioning (ZTP) request comprising a certificate from the network device;
determine the network device is associated with a third party that manages the third party server based on the certificate; and
transmit a redirect message comprising a root certificate chain indicating that the network device is to send the ZTP request to the third party server.

16. The system of claim 15, wherein the third party server is a first third party server, and the system further comprising a second third party server, the operations further comprising:
receive a reauthentication message from the first third party server indicating that the second third party server is associated with the first third party server and is a third party server with permission to perform ZTP of the network device.

17. The system of claim 15, wherein the third party server is a first third party server, and the system further comprising a second third party server, the operations further comprising:
receive a reauthentication message from the first third party server indicating that the network device is being assigned to the second third party server; and update the root certificate chain to indicate that, after being authenticated by the first third party server, the network device is to send ZTP requests to the second third party server.

18. The system of claim 15, the operations further comprising, after the operation of transmit the redirect message, receive a reauthentication message from the third party server identifying that the network device is ready to be reauthenticated.

19. The system of claim 15, the system further comprising:
   a network management device,
   wherein the certificate comprises an organization name, and
   wherein the operation determine the network device is associated with the third party that manages the third party server based on the certificate further comprises:
      determine the organization name included in the certificate matches an OEM name;
      transmit an organization status request to the network management device; and
      receive an organization status indicating that the network device is associated with the third party that manages the third party server.

20. The system of claim 15, the operations further comprising:
   authenticate the network device based on the authentication message and the ZTP request,
   wherein the redirect message is sent in response to authenticating the network device.

* * * * *